United States Patent

Seki et al.

[11] Patent Number: 5,361,174
[45] Date of Patent: Nov. 1, 1994

[54] MAGNETIC REPRODUCING APPARATUS

[75] Inventors: Takahito Seki, Kanagawa; Hajime Inoue, Chiba; Chihoko Takizawa, Saitama, all of Japan

[73] Assignee: Sony Corporation, Tokyo, Japan

[21] Appl. No.: 921,229

[22] Filed: Jul. 29, 1992

[30] Foreign Application Priority Data

Aug. 3, 1991 [JP] Japan .................. 3-217811

[51] Int. Cl.$^5$ .................. G11B 5/09; G11B 5/035
[52] U.S. Cl. .................. 360/46; 360/65
[58] Field of Search .................. 360/65, 46, 45, 64; 375/14

[56] References Cited

U.S. PATENT DOCUMENTS

| 4,580,176 | 4/1986 | Graves et al. | 360/65 |
| 5,057,944 | 10/1991 | Ozaki et al. | 360/64 |
| 5,060,088 | 10/1991 | Dolivo et al. | 360/65 |
| 5,150,379 | 9/1992 | Baugh et al. | 375/14 |

FOREIGN PATENT DOCUMENTS 0109674  5/1984  European Pat. Off. .

OTHER PUBLICATIONS

Design of Automatic Equalizer Including a Decoder of Error–Correction Code, pp. 1142–1146, Kolino et al.
Kato et al. "An Adaptive Equalizer for R–Dat" (Jun. 9, 1989) IEEE Trans. on Consumer Elec. vol. 35, No. 3, Aug. 1989.
Patent Abstracts of Japan, vol. 15, No. 383 (E–1116) 27 Sep. 1991 & JP–A–31 53 185 (Canon Inv.) 1 Jul. 1991.
Patent Abstracts of Japan vol. 14, No. 88 (P–1008) 19 Feb. 1990 & JP–A—12 96 466 (Sony Corp.) 29 Nov. 1989.

Primary Examiner—Donald Hajec
Assistant Examiner—T. N. Forbus, Jr.
Attorney, Agent, or Firm—William S. Frommer; Alvin Sinderbrand

[57] ABSTRACT

Respective regenerative signals from magnetic heads 1A, 1B are combined into one system through a changeover switch 9. After the reproducing characteristic is compensated by using a filter 4 serving as an equalizer, that combined signal is decoded at a decoder 5. An adaptive control unit 7 adjusts (modifies) the characteristic of the filter 4 so that it becomes optimum on the basis of a decode error (residual) at the decoder 5 and an input to the filter 4. The adaptive control unit 7 carries out an adaptive processing in a time divisional manner for every regenerative signal of respective magnetic heads 1A, 1B to send filter coefficients for the respective magnetic heads 1A, 1B to the filter 4. Thus, since the adaptive processing is carried out in a time divisional manner by the filter 4 and the adaptive control unit 7, the circuit scale can be reduced, resulting in low cost.

8 Claims, 6 Drawing Sheets

MAGNETIC REPRODUCING APPARATUS

BACKGROUND OF THE INVENTION

1. Field of the Invention

This invention relates to a magnetic reproducing apparatus, and more particularly to a magnetic reproducing apparatus adapted for converting, e.g., a video signal to a digital signal to reproduce a signal recorded on a magnetic recording medium by making use of a so called partial response system.

2. Description of the Prior Art

Generally, in magnetic recording/reproduction, in order to compensate an amplitude distortion or a phase distortion, etc. resulting from the recording/reproducing characteristic with respect to a magnetic recording medium, an equalizer is used. In recent years, an adaptive equalizing system as used in communication has been adopted also in such magnetic recording/reproduction.

The adaptive equalizing has been conventionally developed as a technology to carry out high speed data transmission utilizing a telephone line. In the telephone line, the transmission path characteristic varies depending upon the connection state of the line. For this reason, since the transmission path characteristic can not be sufficiently corrected with a fixed equalizer, there occurs the necessity of adaptively adjusting the characteristic of the equalizer.

In such a communication system, there are methods in which a signal of which the waveform, etc. is known in advance is transmitted to examine the transmission path characteristic thereafter to transmit a necessary signal (automatic equalizing), and a method in which a signal itself desired to be transmitted is used to examine the transmission path characteristic (adaptive equalizing). In either case, the object of the equalizer is to automatically eliminate distortion from a received signal waveform which was distorted in passing through a transmission path to faithfully restore a transmit signal waveform.

In order to consider application to the magnetic recording/reproduction of adaptive equalizing as described above, such a digital VTR (Video Tape Recorder) adapted to convert a video signal to a digital signal to record the digital signal onto a magnetic tape (video tape) or reproducing it therefrom by using the so-called partial response system is assumed as a magnetic recording/reproducing apparatus. This partial response system is a system of shaping a spectrum of code positively utilizing interference between codes due to the transfer characteristic of the transmission path (or recording medium). For example, NRZI code, Interleaved NRZI code, and the like belong to the partial response. On the recording side, there is provided a so called precoder to convert input data to an intermediate series in order to avoid propagation of code errors at the time of reproduction (discrimination). An example of the configuration on the reproducing side in the case where the above-mentioned adaptive equalizing system is adopted for a digital VTR for carrying out magnetic recording/reproduction by making use of such a partial response system is shown in FIG. 6.

In FIG. 6, a magnetic signal recorded on a magnetic tape (not shown) is converted to an electric signal by using a magnetic head 101. The electric signal thus obtained is then amplified by means of a reproducing amplifier 102. The signal thus amplified is sent to a detection characteristic circuit 103. This detection characteristic circuit 103 has a detection characteristic (decoder characteristic) of the partial response, and a characteristic of $(1+D)$ in the case of the class IV. An output signal from the detection characteristic circuit 103 is delivered to an equalizer 104 comprised of so called a FIR (Finite Impulse Response) or a transversal filter, at which adaptive equalizing processing is implemented to that output signal. The output signal thus processed is then delivered to a decoder 105, at which discrimination between "1" and "0" by level comparison (comparate), etc. is carried out. Thus, decoding of data series at the time of recording is conducted.

An output d from the decoder 105 is sent to an adder (error detector) 106, at which an output y from the equalizer 104 is subtracted from the output d. Thus, an error (residual) e is taken out. The error e thus obtained is sent to an adaptive control unit 107. To this adaptive control unit 107, an output x from the detection characteristic circuit 103 is delivered as a so called reference input. The adaptive control unit 107 adjusts the filter characteristic of the equalizer 104 so as to allow a signal power of the error (residual) to be minimum. In the case where a so called transversal filter is used as the equalizer 104, multiplication coefficients (tap coefficients) for every taps are adaptively modified (corrected) and updated. Thus, the characteristic of the transversal filter is adjusted so that a characteristic close to an inverse characteristic of the electromagnetic conversion characteristic in the magnetic recording/reproduction is provided.

An output from the decoder 105 is sent to a signal processing circuit 108, at which reproduction of a synchronous block and/or error correction, etc. are carried out. The signal thus processed is sent to a video signal processing circuit 109, at which the restoring of original image data is carried out. In addition, although not shown, output data from the signal processing circuit 108 is sent to an video signal processing circuit and a sub-code signal processing circuit, etc. In these circuits, respective processing is carried out.

Meanwhile, in digital VTRs, a quantity of data to be recorded and reproduced becomes extremely large. Particularly, in VTRs of HD (High Definition) TV signal, or the like, when a relative speed of the magnetic head and the tape is merely increased to carry out recording by using a lesser number of channels, there is a limit to the quantity of recordable and reproducible data. As a result, there are many instances where it is impossible to realize a desired system. In view of this, a technique is employed to increase the number of channels for recording and reproduction to realize a great increase in the quantity of recordable and reproducible data by using a magnetic head assembly of the multi-channel type (so called a multi-channel head).

However, the provision of individual adaptive equalizers for every respective channels of such a multi-channel head disadvantageously increases the circuit scale, resulting in increased cost,

SUMMARY OF THE INVENTION

With the above in view, an object of this invention is to provide a magnetic reproducing apparatus in which in the case where magnetic recording and reproduction is carried out by using many channels like a multi-channel head assembly, the configuration of the adaptive equalizer is simplified so that the circuit scale does not become large, thus making it possible to suppress an increase of the cost.

To achieve the above-mentioned object, in accordance with this invention, there is provided a magnetic reproducing apparatus adapted for reproducing magnetic data recorded on a magnetic recording medium, comprising: a filter serving as an equalizer to compensate the characteristic of a regenerative signal from a magnetic head assembly, a decoder for decoding an output signal from the filter, and an adaptive control unit for adaptively adjusting the characteristic of the filter on the basis of an input signal to the filter and input and output signals to and from the decoder, thus to obtain regenerative signals of a plurality of channels from the magnetic head assembly, and to allow the filter and the adaptive control unit to carry out adaptive equalizing processing by using these regenerative signals of a plurality of channels in a time divisional manner.

In accordance with the magnetic reproducing apparatus thus featured, an adaptive equalizing processing is carried by means of one set of the filter and the adaptive control unit with the regenerative signals of a plurality of channels being subjected to time divisional multiplexing. For this reason, the circuit scale is reduced accordingly, thus making it possible to suppress an increase of the cost.

DESCRIPTION OF THE PREFERRED EMBODIMENTS

Figure 1:
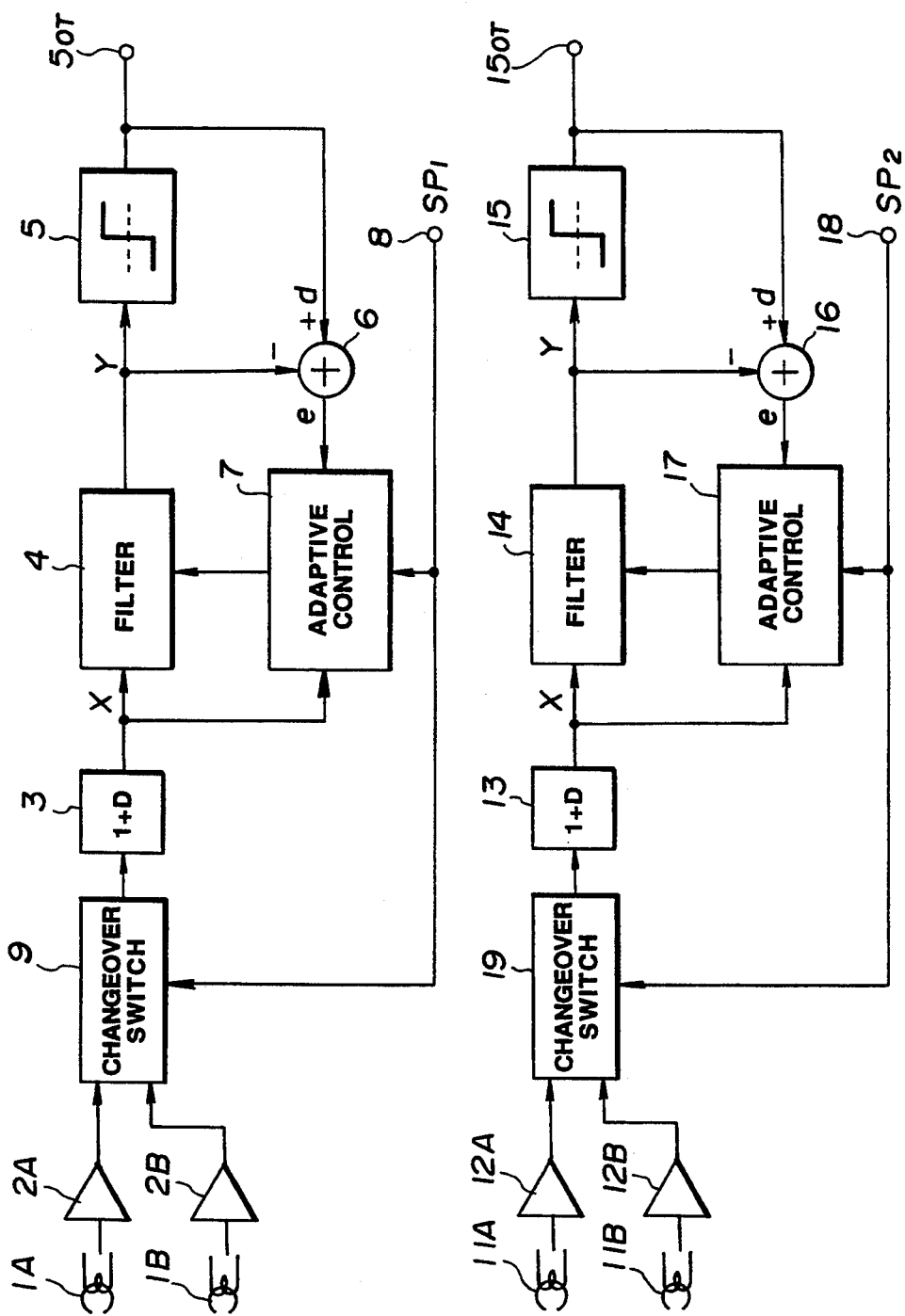
FIG. 1 is a circuit diagram showing, in a block form, the outline of the configuration of a portion of the reproducing system of a digital VTR as an embodiment of a magnetic reproducing apparatus according to this invention.

FIG. 1 is a circuit diagram showing, in a block form, the outline of the configuration of a digital VTR as previously described as an embodiment of a magnetic reproducing apparatus according to this invention.

In FIG. 1, magnetic signals recorded on a magnetic tape (not shown) are converted to electric signals by means of magnetic heads 1A, 1B, 11A and 11B, and are then amplified by means of reproducing amplifiers 2A, 2B, 12A and 12B, respectively. Thus, regenerative signals from the reproducing amplifiers 2A and 2B are sent to a changeover switch 9, and regenerative signals from the reproducing amplifiers 12A and 12B are sent to a changeover switch 19. Such regenerative signals are subjected to switching control.

Figure 2:
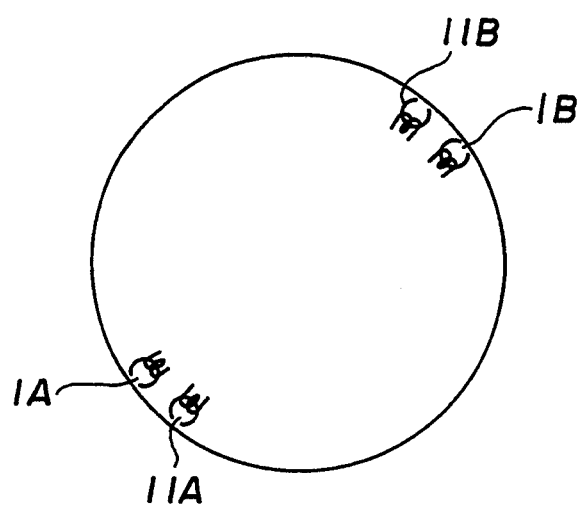
FIG. 2 is a plan view schematically showing an actual example of a head arrangement of rotary heads used in this embodiment.
Figure 3:
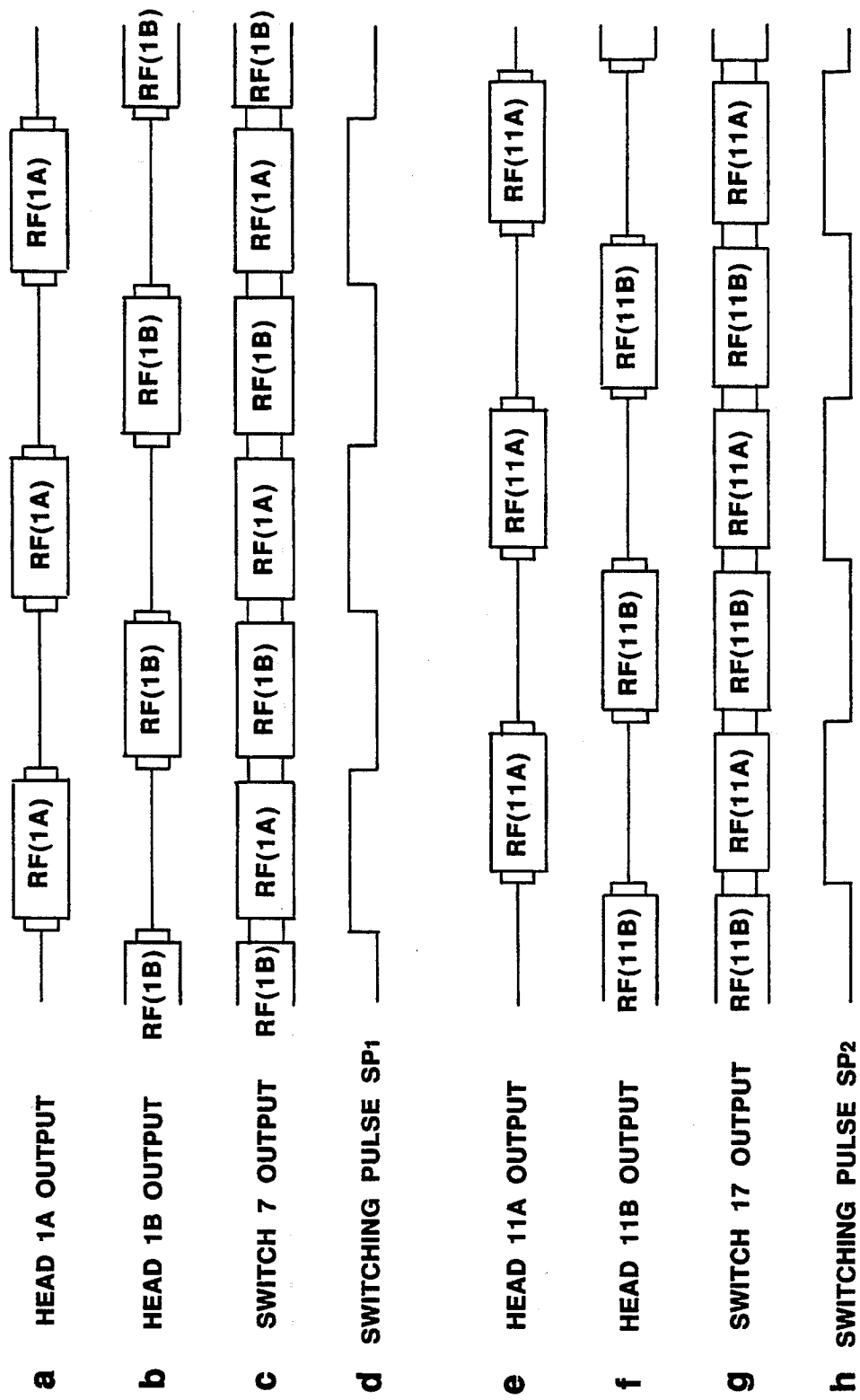
FIG. 3 is a time chart for explaining the operation of this embodiment.

FIG. 2 schematically shows a head arrangement of rotary heads. A set of adjacent magnetic heads 1A, 11A and a set of adjacent magnetic heads 1B, 11B constitute so called multi-channel heads. A multi-channel head assembly comprised of the set of magnetic heads 1A, 11A and a multi-channel head comprised of the set of magnetic heads 1B, 11B are arranged on a rotary drum with an angular difference of 180 degrees therebetween. A magnetic tape is assumed to run while being guided in the state wound at a lapping angle of about 180 degrees around the rotary drum. At this time, regenerative output signals from respective magnetic heads 1A, 1B, 11A, 11B are designated at $a$, $b$, $e$ and $f$ of FIG. 3, respectively. In FIG. 3, reproduced outputs from respective magnetic heads 1A, 1B, 11a and 11B are designated at RF (1A), RF (1B), RF (11A) and RF(11B), respectively. To the changeover switches 9 and 19 are respectively supplied with switching pulses $SP_1$ and $SP_2$ as indicated by $d$ and $h$ of FIG. 3 for carrying out switching control of heads in dependency upon rotational phases of the rotary heads, respectively. Accordingly, output signals from respective changeover switches 9 and 19 are as shown at $c$ and $g$ of FIG. 3.

Figure 6:
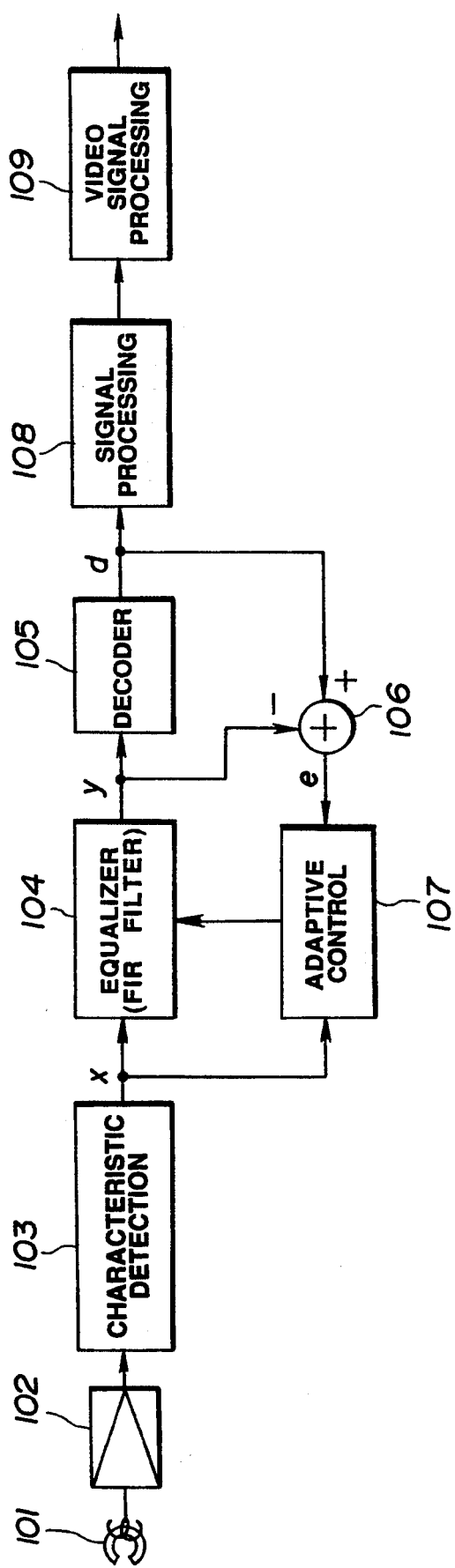
FIG. 6 is a circuit diagram showing, in a block form, the outline of the configuration of the reproducing system of a digital VTR used for explanation of the prior art.

An output signal from the changeover switch 9 is sent to a detection characteristic circuit 3. This detection characteristic circuit 3 has a detection characteristic (encoded characteristic) of the previously described partial response, and has a characteristic of (1+D) in the case of class IV. An output signal from the detection characteristic circuit 3 is delivered to a filter 4 serving as the main part of the equalizer. As this filter 4, so called a FIR (Finite Impulse Response) filter or a transversal filter is generally used. Its filter characteristic is adaptively adjusted by an adaptive control unit 7 (which will be described later). An output signal from the filter 4 is delivered to a decoder 5, at which discrimination between "1" and "0" by level comparison (comparate), etc. is carried out. Thus, decoding of data series at the time of recording is carried out. An output signal from the decoder 5 is taken out through an output terminal $5_{OT}$. Further, an output signal from the changeover switch 19 is delivered to a detection characteristic circuit 13, and is taken out from an output terminal $15_{OT}$ through a filter 14 and a decoder 15. Respective data signals from these output terminals $5_{OT}$, $15_{OT}$ are sent to the previously described signal processing circuit 108, etc. shown in FIG. 6.

Since the operation on the adaptive filter side comprised of the filter 4 and the adaptive control unit 7 and the operation on the adaptive filter side comprised of the filter 14 and the adaptive control unit 17 are the same, only one side, e.g., the filter 14 and the adaptive control unit 17 side will now be described.

An adder (error detector) 16 subtracts an output y of the filter 14 of the equalizer from an output d of the decoder 15 to thereby take out an error (residual) e to send this error e to the adaptive control unit 17. At this time, the adaptive control unit 17 is supplied with an output x from the detection characteristic circuit 13 as a so called reference input. As the result of the fact that the adaptive control unit 17 modifies/updates coefficients (tap coefficients) of the filter 14 so as to allow the signal power of the error (residual) to be minimum, the equalizer characteristic is adjusted in such a manner that it becomes close to a characteristic opposite to that of the electromagnetic conversion characteristic in the magnetic recording/reproduction.

Here, in the adaptive filter (adaptive equalizer) comprised of the filter 14 and the adaptive control unit 17, a regenerative signal shown at g of FIG. 3 is adaptively subjected to equalizing processing, and adaptive processing respectively corresponding to an output RF (11A) from the head 11A and an output RF(11B) from the head 11B are carried out under time switching control in a time divisional manner in accordance with a switching pulse shown at h.

As stated above, respective filter coefficients (filter tap coefficients) are selectively switched in accordance with respective reproduced outputs RF (11A), RF (11B) from the heads 11A, 11B so that the adaptive processing is carried out in a time divisional manner. Thus, effective utilization of the hardware configuration is permitted, making it possible to prevent the cost from increasing resulting from an increase of the circuit scale, OF the like.

An example of an actual configuration of a so called adaptive filter comprised of the filter 14 and the adaptive control unit 17 will now be described with reference to FIG. 4.

Figure 4:
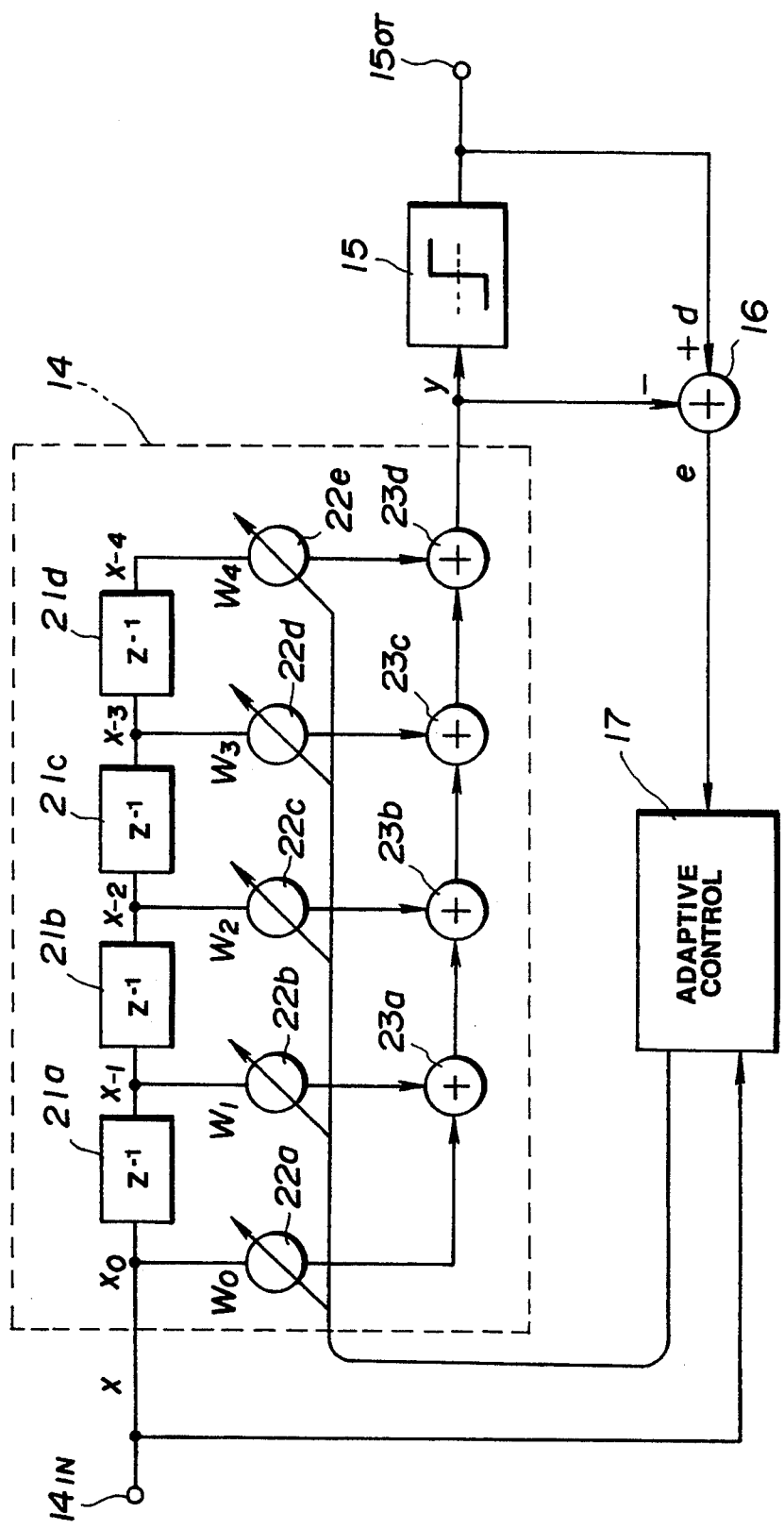
FIG. 4 is a circuit diagram showing, in a block form, an actual example of the internal configuration of an adaptive equalizer (adaptive filter used in this embodiment.

In FIG. 4, a reference input x from an input terminal $14_{IN}$ is sent to a series circuit comprised of delay elements corresponding to the number of taps, e.g., four delay elements 21a, 21b, 21c and 21d. An input $x_0$ from the input terminal $14_{IN}$ and outputs $x_{-1}$, $x_{-2}$, $x_{-3}$ and $x_{-4}$ from the delay elements 21a, 21b, 21c and 21d are sent to coefficient multipliers 22a, 22b, 22c, 22d and 22e, respectively. At these multipliers, those outputs are multiplied by filter coefficients $W_0$, $W_1$, $W_2$, $W_3$ and $W_4$, respectively. Then, corresponding multiplied results or values are subjected to the following additive operation. Namely, respective outputs from the coefficient multipliers 22a and 22b are added at an adder 23a, and an output from the coefficient multipliers 22c and an output from the adder 23a are added at an adder 23b. Additive operation similar to the above is applied to outputs from the remaining coefficient multipliers. Namely, an output from the coefficient multiplier 22d and an output from the adder 23b are added at an adder 23c. In addition, an output from the coefficient multiplier 22e and an output from the adder 23c are added at an adder 23d. Thus, an output y is provided as an output from the adaptive filter. This output y is sent to the above-mentioned decoder 15. It is to be noted that respective filter coefficients $W_0$, $W_1$, $W_2$, $W_3$ and $W_4$ are modified by a coefficient modifying (updating) control signal from the adaptive control unit 17.

As the adaptive algorithm used in the adaptive control unit 17, many techniques have been proposed. Explanation will now be given in connection with the LMS (Least Mean Square) algorithm as its actual example. Here, the number of delay elements is generalized so that it becomes equal to L, and delay elements are assumed to be designated at $21_1$, $21_2$, ..., $21_L$. At this time, Further assumption is made such that the above-mentioned first input $x_0$ and outputs $x_{-1}$, $x_{-2}$, ... $x_{-L}$ from the delay elements $21_1$, $21_2$, ..., $21_L$ are sent to coefficient multipliers $22_0$, $22_1$, $22_2$, ..., $22_L$, and are then multiplied by filter coefficients $W_0$, $W_1$, $W_2$, ..., $W_L$, respectively. The values thus obtained are sent to adders, at which additive operation similar to the above is implemented thereto.

When input data at the k-th sample period time of (time k) of data series of an input x and delay output data from the delay elements $21_1$, $21_2$, ..., $21_L$ are assumed to be designated at $x_k$, $x_{k-1}$, $x_{k-2}$, ..., $x_{k-L}$, an input vector $X_k$ subjected to the FIR filtering is defined as follows:

$$X_k = [x_k x_{k-1} x_{k-2} \ldots x_{k-L}]^T \qquad (1)$$

In the above formula (1), T indicates a transposition symbol. When respective filter coefficients (weighting coefficients) are assumed as $W_{k0}$, $W_{k1}$, $W_{k2}$, ..., $W_{kL}$ with respect to th,s input vector $X_k$, and a FIR filter output is assumed as $y_k$, the relationship of input/output is expressed by the following formula (2)

$$y_k = w_{k0} x_k + w_{k1} x_{k-1} + \ldots + w_{kL} x_{k-L} \qquad (2)$$

Further, if a filter coefficient vector (weighting vector) $w_k$ is defined as follows:

$$W_k = [w_{k0} w_{k1} w_{k2} \ldots w_{kL}]^T \qquad (3)$$

the input/output relationship is described as follows:

$$y_k = X_k^T W_k = W_k^T X_k \qquad (4)$$

If a desired response is $d_k$, an error $\epsilon_k$ between the desired response and the output $y_k$ is expressed as follows:

$$\begin{aligned} \epsilon_k &= d_k - y_k \\ &= d_k - X_k^T W_k \end{aligned} \qquad (5)$$

Since $W_k$ is updated so that $\epsilon_k$ becomes equal to zero, the following formula is used: $W_{k+1} = W_k - \mu \nabla_k$ (6)

In this formula, M is a gain factor determining the speed and the stability of the adaptive processing, and $\nabla_k$ indicates gradient. In the LMS algorithm, $\nabla_k$ is not estimated from a short-time mean of $\epsilon_k^2$, but is obtained by directly partially differentiating $\epsilon_k^2$.

$$\begin{aligned} \nabla_k &= \delta \epsilon_k^2 / \delta W \\ &= -2 \epsilon_k X_k \end{aligned} \qquad (7)$$

By substitution of the formula (7) into the formula (6), the coefficient updating formula is expressed as follows:

$$W_{k+1} = W_k + 2\mu \epsilon_k X_k \qquad (8)$$

Referring to FIG. 1 again, the adaptive control unit 17 detects a rise of the switching pulse $SP_2$ to output filter coefficients corresponding to the head 11A. At this time, the adaptive control unit 17 inputs the respective signals x, y and e relating to the head 11A to perform an operation in accordance with the adaptive algorithm with respect to the signals obtained to obtain updated filter tap coefficients to store them into a memory, etc. Then, the adaptive control unit 17 detects a fall of the switching pulse $SP_2$ to output filter coefficients corresponding to the head 11B to perform an operation in accordance with the adaptive algorithm with respect to the respective signals x, y and e relating to the head 11B to obtain updated filter tap coefficients to store them into the memory, etc. By repeating such adaptive control operation, adaptive equalizing processing for regenerative signals from the respective heads 11A, 11B can be realized by the hardware of a single system in a time divisional multiplexing manner. It is to be noted that it is a matter of course that an operation similar to the above is carried out also with respect to the adaptive control unit 7.

Figure 5:
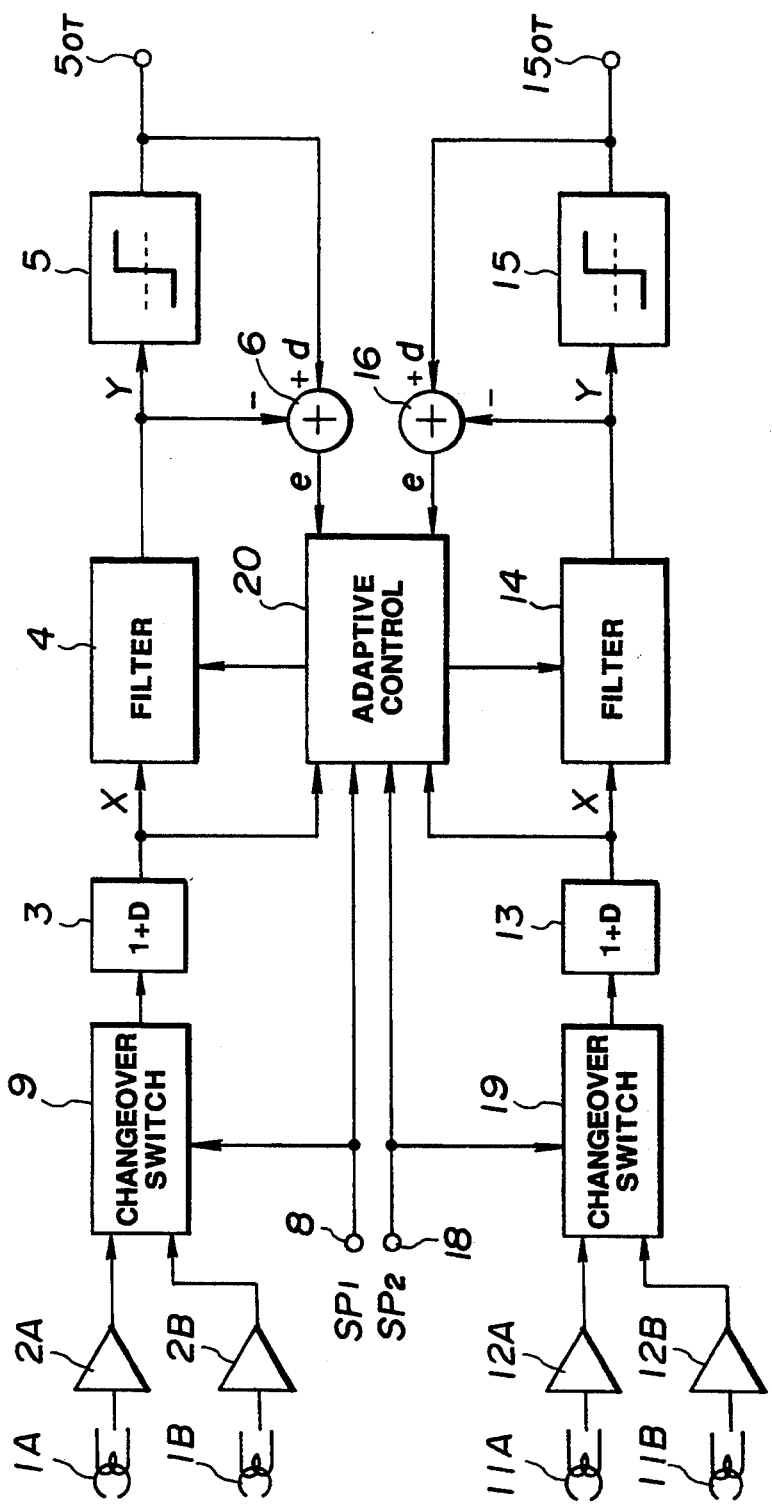
FIG. 5 is a circuit diagram showing, in a block form, the outline of the configuration of a portion of the reproducing system of a digital VTR as another embodiment of a magnetic reproducing apparatus according to this invention.

FIG. 5 shows the outline of the configuration in the case where a single adaptive control unit 20 is used for all regenerative signals from the heads 1A, 1B, 11A and 11B as another embodiment of this invention. This adaptive control unit 20 sends filter tap coefficients to respective filters 4 and 14. Since other components are the same as those of the above-described embodiment of FIG. 1, the same reference numerals are respectively attached to corresponding portions, and their explanation is omitted here. Further, in FIG. 5, regenerative signals from respective magnetic heads 1A, 1B, 11A and 11B, output signals from respective changeover switches 7 and 17, and switching pulse signals $SP_1$ and $SP_2$ are indicated in a manner similar to that as in FIG. 3.

In the embodiment shown in FIG. 5, the adaptive control unit 20 detects rise a of the switching pulse $SP_1$ to output filter coefficients for the head 1A to the filter 4 to input the respective signals x, y and e relating to the head 1A to perform an operation in accordance with the adaptive algorithm with respect to the signals obtained to obtain updated filter tap coefficients to store them into a memory, etc. Then, the adaptive control unit 20 detects a rise of the switching pulse $SP_2$ to send coefficients for the head 11A to the filter 14 to input the respective signals x, y and e relating to the head 11A to perform an operation in accordance with the adaptive algorithm with respect to the signals obtained to store updated filter tap coefficients into the memory, etc. Then, the control unit 20 detects a fall of the switching pulse signal $SP_1$ to output coefficients for the head 1B to the filter 4 to input the respective signals x, y and e relating to the head 1B to perform an operation in accordance with the adaptive algorithm with respect to the respective signals obtained to obtain updated filter tap coefficients to store them into the memory. Then, the control unit 20 detects a fall of the switching pulse signal $SP_2$ to send coefficients for the head 11B to the filter 14 to perform an operation in accordance with the adaptive algorithm with respect to the respective signals x, y and e relating to the head 11B to obtain updated filter tap coefficients to store them into the memory. By repeating such adaptive control operation, adaptive equalizing processing corresponding to all regenerative signals from the respective heads 1A, 1B, 11A, 11B can be realized by the hardware of a single system in a time divisional multiplexing manner.

It is to be noted that in the case where processing cannot be satisfactorily executed because of low processing speed of the hardware, processing may be executed with a portion thereof being thinned. In actual terms, in the preceding repetitive cycle, inputs of respective signals x, y and e relating to the head 11A after the rise of the switching pulse $SP_2$ is detected and an operational processing in conformity with the adaptive algorithm is thinned; and, in the succeeding repetitive cycle, respective signals x, y and e relating to the head 1A after the rise of the switching pulse signal $SP_1$ is detected, and an operational processing in conformity with the adaptive algorithm is thinned. At times subsequent thereto, processing is thinned, with every processing relating to one of four kinds of magnetic heeds.

It should be noted that this invention is not limited to the above-described embodiments. For example, the actual configuration of the filter 14 and/or the algorithm used in the adaptive control unit 17, etc. are not limited to the FIR filter and the LMS algorithm, respectively. In addition, equipments applied are not limited to a digital VTR, and this invention may be applied to a digital tape recorder, an analog VTR, or the like.

What is claimed is:

1. A magnetic reproducing apparatus having a plurality of rotary magnetic heads for reproducing magnetic data recorded on a magnetic recording medium, comprising:

equalizing filter means having adjustable equalizing characteristics for compensating regenerative signals reproduced by said rotary magnetic heads, combining means for combining the regenerative signals reproduced by said plurality of rotary magnetic heads to supply the regenerative signals to said equalizing filter means in multiplexed form, a decoder for decoding the compensated regenerative signals produced by the equalizing filter means to provide a decoded signal, error detecting means coupled to said decoder for producing an error indication between the compensated regenerative signal and the decoded signal, and an adaptive control unit for adaptively adjusting the equalizing characteristics of the filter means as a function of the regenerative signal supplied to the filter means and said error indication.

2. A magnetic reproducing apparatus as set forth in claim 1, wherein said equalizing filter means comprises an FIR (Finite Impulse Response) filter.

3. A magnetic reproducing apparatus as set forth in claim 1, wherein said decoder comprises level-discrimination means for level discriminating the compensated regenerative signals from said equalizing filter means to thereby convert said compensated regenerative signals to binary signals of "1's" and "0's".

4. A magnetic reproducing apparatus as set forth in claim 1, wherein said equalizing filter means includes tap filter coefficients and wherein said adaptive control unit is operative in accordance with an adaptive algorithm to modify said filter tap coefficients to minimize said error indication.

5. A magnetic reproducing apparatus as set forth in claim 4, wherein said adaptive algorithm is an LMS (Least Mean Square) algorithm to modify said filter tap coefficients of said equalizing filter means.

6. A magnetic reproducing apparatus as set forth in claim 1, further comprising respective amplifiers for receiving said regenerative signals reproduced by respective ones of said plurality of rotary magnetic heads.

7. A magnetic reproducing apparatus as set forth in claim 6, wherein said combining means comprises a changeover switching circuit operable in synchronism with the rotation of said rotary magnetic heads and coupled to said amplifiers for supplying to said equalizing filter means the regenerative signals reproduced by said rotary magnetic heads, respectively.

8. A magnetic reproducing apparatus as set forth in claim 1, further comprising detection characteristic means coupled to said combining means to receive said multiplexed regenerative signals for carrying out a partial response detection on the regenerative signals and to produce an output which is supplied to said equalizing filter means.

* * * * *